US009489149B2

(12) United States Patent
Delaney et al.

(10) Patent No.: US 9,489,149 B2
(45) Date of Patent: Nov. 8, 2016

(54) METHODS AND SYSTEMS FOR USING A WRITE CACHE IN A STORAGE SYSTEM

(71) Applicant: NETAPP, INC., Sunnyvale, CA (US)

(72) Inventors: William Patrick Delaney, Wichita, KS (US); Joseph Russell Blount, Andover, KS (US); Rodney A. DeKoning, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 151 days.

(21) Appl. No.: 14/305,942

(22) Filed: Jun. 16, 2014

(65) Prior Publication Data

US 2015/0363285 A1 Dec. 17, 2015

(51) Int. Cl.
*G06F 11/00* (2006.01)
*G06F 3/06* (2006.01)
*G06F 11/14* (2006.01)
*G06F 11/20* (2006.01)

(52) U.S. Cl.
CPC ............ *G06F 3/0685* (2013.01); *G06F 3/065* (2013.01); *G06F 3/0619* (2013.01); *G06F 11/1441* (2013.01); *G06F 11/2015* (2013.01)

(58) Field of Classification Search
CPC ........... G06F 11/1471; G06F 11/1438; G06F 11/1469; G06F 11/1435
See application file for complete search history.

(56) References Cited

U.S. PATENT DOCUMENTS

| | | | | | |
|---|---|---|---|---|---|
| 4,490,782 | A * | 12/1984 | Dixon | ................. | G06F 12/0862 711/136 |
| 5,603,004 | A * | 2/1997 | Kurpanek | ........... | G06F 12/0864 711/118 |
| 5,729,713 | A * | 3/1998 | Leyrer | ................. | G06F 12/0888 711/118 |
| 6,385,706 | B1 * | 5/2002 | Ofek | ................... | G06F 11/1464 707/999.202 |
| 6,529,995 | B1 * | 3/2003 | Shepherd | ............ | G06F 11/1435 707/999.202 |
| 6,792,498 | B2 * | 9/2004 | Nakamura | .......... | G06F 12/0897 711/117 |
| 7,165,144 | B2 * | 1/2007 | Choubal | ............. | G06F 12/0835 711/118 |
| 7,640,381 | B1 * | 12/2009 | Zhang | ..................... | G06F 3/061 710/5 |
| 8,041,748 | B2 * | 10/2011 | Taneja | .............. | G06F 17/30902 707/803 |
| 8,041,850 | B2 * | 10/2011 | Kasahara | ............ | G06F 11/1076 710/2 |
| 8,046,551 | B1 * | 10/2011 | Sahin | .................. | G06F 11/2074 711/162 |
| 8,296,537 | B2 * | 10/2012 | Inoue | .................. | G06F 11/2058 707/648 |
| 8,378,671 | B1 * | 2/2013 | Mahoney | | |
| 8,504,766 | B2 * | 8/2013 | Young | ................. | G06F 12/0804 711/113 |
| 8,996,807 | B2 * | 3/2015 | Joshi | .................. | G06F 9/45558 711/100 |
| 9,176,881 | B2 * | 11/2015 | Kobayashi | .......... | G06F 12/0866 |
| 2002/0152355 | A1 * | 10/2002 | Otterness | ............. | G06F 3/0617 711/114 |
| 2003/0014568 | A1 * | 1/2003 | Kishi | .................. | G06F 11/2074 710/4 |

(Continued)

*Primary Examiner* — Amine Riad
(74) *Attorney, Agent, or Firm* — Haynes and Boone, LLP

(57) ABSTRACT

Methods and systems for storing data at a storage device of a storage system are provided. The data is first temporarily stored at a first write cache and an input/output request for a persistence storage device used as a second write cache is generated, when an I/O request size including the received data has reached a threshold value. The data from the first cache is transferred to the persistence storage device and a recovery control block with a location of the data stored at the persistence storage device is updated. An entry is added to a linked list that is used to track valid data stored at the persistence storage device and then the data is transferred from the persistence storage device to the storage device of the storage system.

17 Claims, 11 Drawing Sheets

(56) References Cited

U.S. PATENT DOCUMENTS

| | | | | |
|---|---|---|---|---|
| 2004/0103247 | A1* | 5/2004 | Bita | G06F 12/0866 711/114 |
| 2004/0255181 | A1* | 12/2004 | Hsu | G06F 11/1441 714/2 |
| 2008/0104344 | A1* | 5/2008 | Shimozono | G06F 11/1441 711/162 |
| 2012/0159067 | A1* | 6/2012 | Kelton | G06F 11/1076 711/113 |
| 2012/0278511 | A1* | 11/2012 | Alatorre | G06F 3/0605 710/33 |
| 2012/0303842 | A1* | 11/2012 | Cardinell | G06F 13/28 710/22 |
| 2013/0198553 | A1* | 8/2013 | Oguro | G06F 1/305 713/340 |
| 2014/0156910 | A1* | 6/2014 | Uttamchandani | G06F 3/061 711/103 |
| 2014/0281123 | A1* | 9/2014 | Weber | G06F 12/0246 711/103 |
| 2015/0039789 | A1* | 2/2015 | Bisht | G06F 3/0613 710/34 |
| 2015/0193144 | A1* | 7/2015 | Bilas | G06F 12/0875 711/103 |

* cited by examiner

Example a 2MB data write to disk 136 LBAs 0x1000 to 0x1FFF

Linked List Entries for the 2MB data write of Fig. 1C to disk 136 LBAs 0x1000 to 0x1FFF

METHODS AND SYSTEMS FOR USING A WRITE CACHE IN A STORAGE SYSTEM

TECHNICAL FIELD

The present disclosure relates to storage system arrays and more particularly, to using write cache at storage system arrays.

BACKGROUND

A storage system array typically includes one or more storage devices where information may be stored, and from where information may be obtained, as desired. The storage system array typically includes a storage operating system that functionally organizes the system by, inter alia, invoking storage operations in support of a storage service implemented by the storage system array. The storage system array may be implemented in accordance with a variety of storage architectures including, but not limited to, a network-attached storage environment, a storage area network and a storage device directly attached to a user or host computer.

Storage system arrays typically use a write cache for writing data at storage devices. The write cache is typically a volatile memory, for example, a dynamic random access memory (DRAM)). Storage system arrays also use battery power to copy data from the volatile memory, write cache to persistence storage, if there is disruption to the main power supply of the storage system array. The amount of available battery power is typically limited. This limits the amount of data one can move from the write cache to persistence storage before running out of battery power. Therefore, this limits the size of the write cache that can be used by storage system arrays because storage system arrays should be able to secure user data in case of a power failure. Continuous efforts are being made to increase the write cache size so that the storage system arrays can efficiently write client data, while providing assurance that in case of a power failure, data will be not be lost.

SUMMARY

In one aspect, a machine implemented method is provided. The method includes receiving data for storing at a storage device of a storage system; temporarily storing the data at a first write cache; generating an input/output (I/O) request for a persistence storage device used as a second write cache, when an I/O request size including the received data has reached a threshold value; and transferring the data from the first cache to the persistence storage device.

The method further includes updating a recovery control block with a location of the data stored at the persistence storage device; adding an entry at a linked list that is used to track valid data stored at the persistence storage device; and transferring the data from the persistence storage device to the storage device of the storage system.

In another aspect, a non-transitory, machine readable storage medium having stored thereon instructions for performing a method is provided. The machine executable code which when executed by at least one machine, causes the machine to: receive data for storing at a storage device of a storage system; temporarily store the data at a first write cache; generate an input/output (I/O) request for a persistence storage device used as a second write cache, when an I/O request size including the received data has reached a threshold value; transfer the data from the first cache to the persistence storage device; update a recovery control block with a location of the data stored at the persistence storage device; add an entry at a linked list that is used to track valid data stored at the persistence storage device; and transfer the data from the persistence storage device to the storage device of the storage system.

In yet another aspect, a system with a memory having machine readable medium comprising machine executable code having stored thereon instructions; and a processor module coupled to the memory are provided. The processor module is configured to execute the machine executable code to: receive data for storing at a storage device of a storage system; temporarily store the data at a first write cache; generate an input/output (I/O) request for a persistence storage device used as a second write cache, when an I/O request size including the received data has reached a threshold value; transfer the data from the first cache to the persistence storage device; update a recovery control block with a location of the data stored at the persistence storage device; add an entry at a linked list that is used to track valid data stored at the persistence storage device; and transfer the data from the persistence storage device to the storage device of the storage system.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used in this disclosure are intended to refer to a computer-related entity, either programmable instructions-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

In one aspect, a storage system array uses a plurality of write cache for temporarily storing data, before the data is stored at persistence storage, which may include one or more solid-state storage devices (SSDs). As an example, a first write cache may be volatile memory (for example, a dynamic random access memory (DRAM)) and a second write cache may include hard disk drives. A flusher module is provided that handles data movement between the first write cache, the second write cache and the persistence storage, as described below in detail.

Figure 1A:
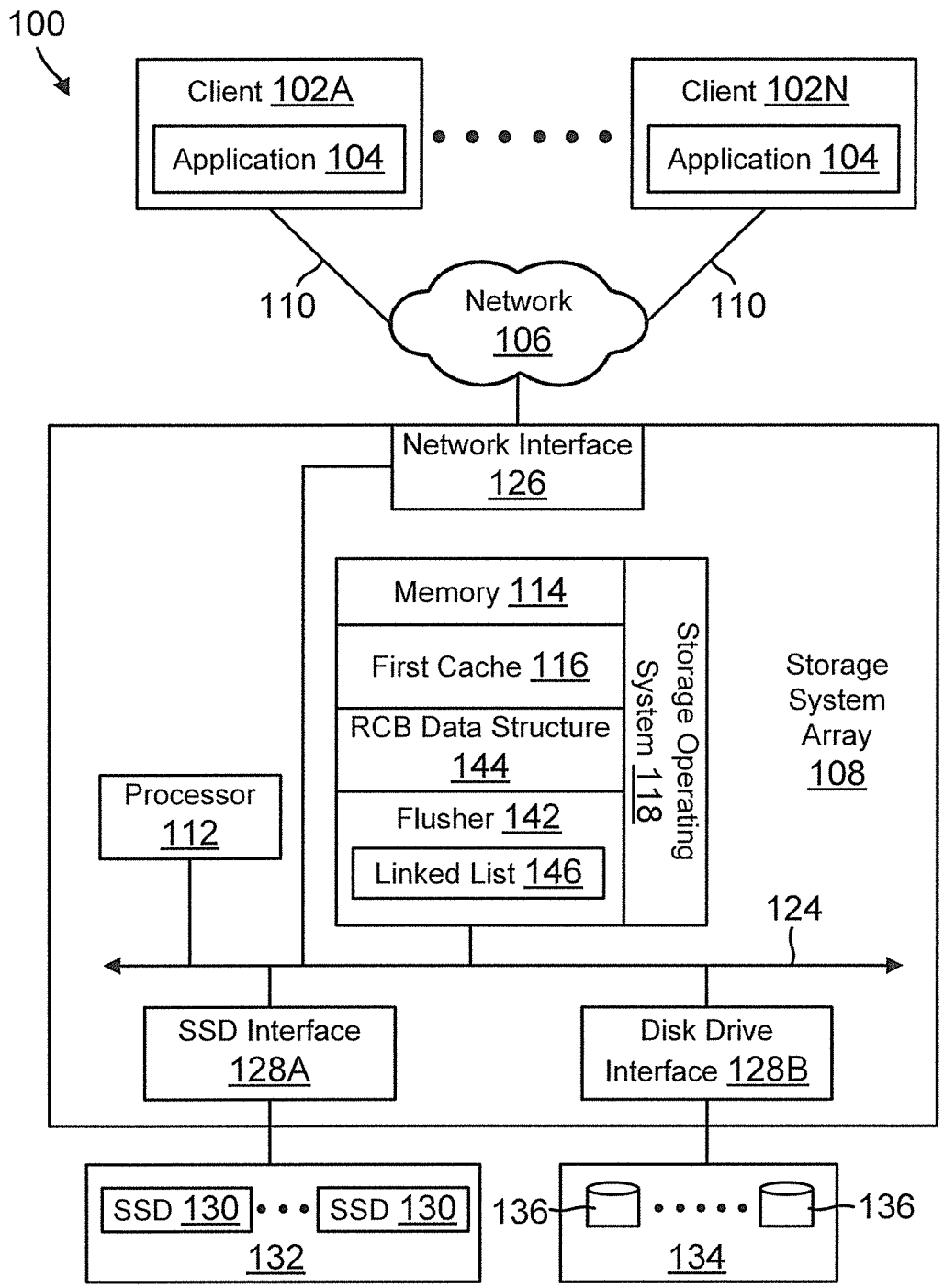
FIG. 1A shows a block diagram of a system using the aspects disclosed herein.

System 100:

FIG. 1A is a schematic block diagram of an operating environment 100 (also referred to as system 100) having a storage system array 108 that may be advantageously used with the various aspects of the present disclosure. System 100 is used to store one or more data containers, for example, directories, files, structured and unstructured data at storage devices 130 of a storage sub-system 132 and provide storage related services relating to the organization of information stored at storage devices 130. Storage devices 130 may be, for example, solid state drives (SSDs) or any other type of storage device suitable for storing data.

Storage system array 108 comprises one or more processor 112 (also referred to as a central processing unit (CPU)), a memory 114, a network interface 126, a SSD interface 128A and a disk drive (may also be referred to as hard drive or "HD") interface 128B interconnected by an interconnect system (or bus system) 124. Storage system array 108 may include other modules, for example, a display device, keyboard and other devices, the details of which are not germane to the aspects disclosed herein.

Processor 112 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices for executing instructions out of memory 114. The bus system 124, may include, for example, a system bus, a Peripheral Component Interconnect (PCI) bus, a HyperTransport or industry standard architecture (ISA) bus, a small computer system interface (SCSI) bus, a universal serial bus (USB), an Institute of Electrical and Electronics Engineers (IEEE) standard 1394 bus (sometimes referred to as "Firewire"), a memory bus or any other interconnect type.

In the illustrative aspects, memory 114 comprises storage locations that are addressable by processor 112 and other modules, for example, network interface 126, SSD interface 128A and HD interface 128B for storing machine executable instructions or "code". Processor 112 may execute an operating system 118 out of memory 114 for controlling the overall operations of storage system array 108.

A portion of the memory 114 may be further organized as a "cache" 116 that is used as a first write cache for temporarily storing data, as described below in detail. In one aspect, system 100 also includes a second write cache that may include persistence storage, for example, disk drives 136 (may also referred to as HDDWC (hard disk drive write cache) 136) of a disk drive sub-system 134. Disk drive system 134 may include tape drives, conventional magnetic disks, optical disks such as CD-ROM or DVD based storage, magneto-optical (MO) storage or any other storage device type. The examples disclosed herein may reference the hard drives as "disks" as a "disk drive" but the adaptive aspects disclosed herein are not limited to any particular type of storage media/device.

In one aspect, storage system array 108 executes a flusher module 142 (may also be referred to as flusher 142) out of memory 114. The flusher module 142 is used to manage disks 136 as a write cache and co-ordinate data movement between the first cache 116, the second cache 136 and SSDs 130.

Flusher 142 maintains a linked list 146 for tracking write operations at disks 136. It is noteworthy that although the various aspects of the present disclosure are described with respect to the linked list 146, one skilled in the art will appreciate that any other tracking mechanism, for example, a bitmap, a sorted array or any other mechanism may be used for tracking the write operations.

Every time a "data chunk" is written to disks 136, the linked list 146 is updated with an entry that identifies the data and the location where it is written. Flusher 142 also has access to a recovery control block data structure (RCB) 144 that stores a plurality of entries. Each entry identifies a data chunk and a location where the data resides. It is noteworthy that more than one RCB may be used by the adaptive aspects described herein. If there is a power failure, then the RCB data structure 144 is transferred to persistence storage and then used to re-construct the linked list 146. Details regarding linked list 146 and RCB 144 are provided below.

The network interface 126 of storage system 108 includes mechanical, electrical and signaling circuitry to connect the storage system array 108 to one or more client systems 102A-102N (may be referred to as "client 102" or host system 102) over a network 106 (also referred to as connection system 106), which may comprise a point-to-point connection or a shared medium, such as a local area network. Illustratively, network 106 may be embodied as an Ethernet network, a Fibre Channel (FC) network or any other network type. The client 102 may communicate with the storage system array 108 over network 106 by exchanging discrete frames or packets of data according to predefined protocols, such as the Transmission Control Protocol/Internet Protocol (TCP/IP).

Client 102 may be a general-purpose computer configured having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information (for example, an application 104) that is stored in main memory at execution time. Typically, the main memory is composed of random access memory (RAM) circuits.

Applications 104 may be an electronic mail application, a virtual machine, a database application or any other application type. Application 104 may initiate a read or write operation (jointly or separately referred to as an input/output (I/O) operation) for using SSDs 130.

Client 102 may interact with the storage system array 108 in accordance with a client/server model of information delivery. That is, the client may request the services of the storage system array 108, and the storage system array 108 may return the results of the services requested by the client, by exchanging packets 110 over the network 106. The client 102 (or application 104) may issue packets using block-based access protocols, such as the Small Computer Systems Interface (SCSI) protocol encapsulated over TCP (iSCSI) and SCSI encapsulated over Fibre Channel (FCP). Alternatively, the clients may issue packets using file-based access protocols, such as the Common Internet File System (CIFS) protocol or Network File System (NES) protocol, over TCP/IP when accessing information stored at SSDs 130.

Storage space at SSDs 130 may be presented as a logical object (for example, a logical unit number (LUN) or a storage volume, used interchangeably throughout this specification) to clients. Each storage volume has a size, a unique identifier and an associated drive that is used by application 104 to read and write data. The term storage volume as used herein means a logical data set which is an abstraction of physical storage, combining one or more physical mass storage devices or parts thereof into a single logical storage object. The storage devices within a storage volume are typically organized as one or more groups, where each group may be operated as a Redundant Array of Independent (or Inexpensive) Disks (RAID).

SSD interface 128A and HD interface 128B include input/output (I/O) interface circuitry that couples to the storage devices (SSD 130 and disks 136) over an I/O interconnect arrangement, such as a conventional high-performance, FC serial link topology. HD interface 128B is used to access the disk drive system 134 having disks 136 that may be used as the second write cache, as described below in detail.

Figure 1B:
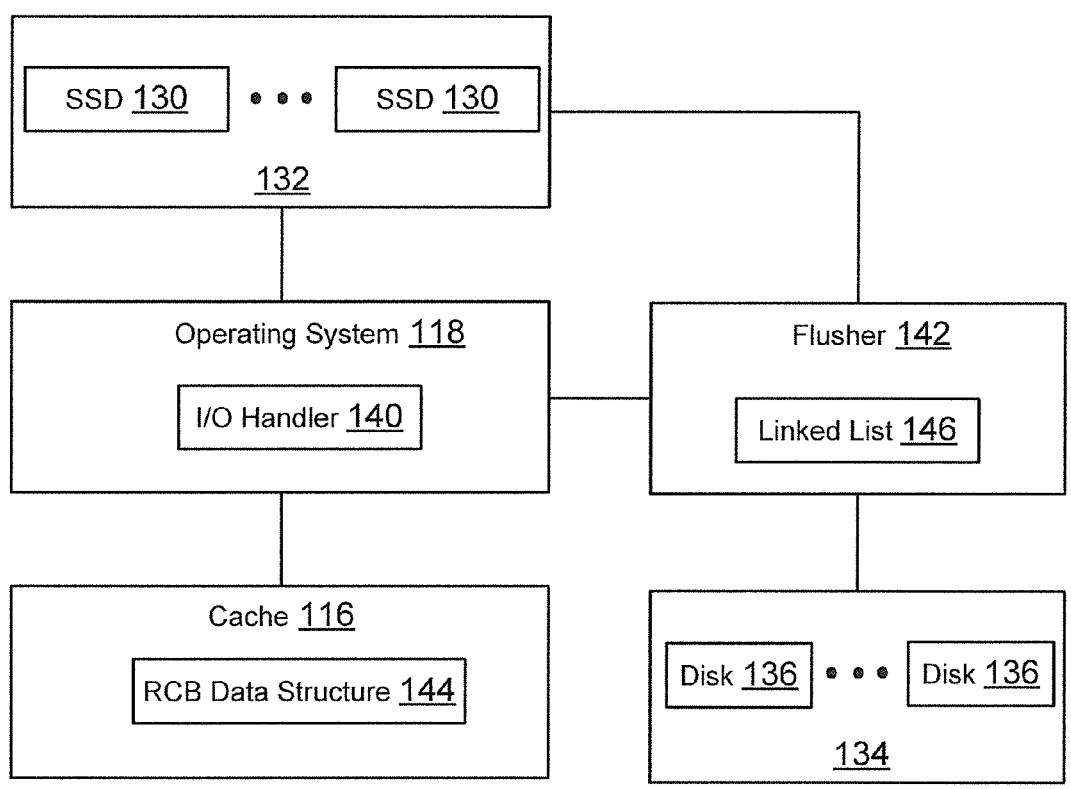
FIG. 1B shows a flusher module used by the system 100 of FIG. 1A, according to one aspect.

FIG. 1B shows an example of using flusher 142 to manage data movement between cache 116, SSDs 132 and disks 136, according to one aspect of the present disclosure. The storage operating system 118 executes an I/O handler module 140 that handles clients I/O requests for reading and writing data. Before data is written to SSDs 130, the data may be written at cache 116. To enable write caching at cache 116, typically, the state of cache 116 alternates between "clean" and "dirty" depending on where data is stored. For example, when data is sent by client 102 it is referred to as "dirty". When the dirty data is flushed (or moved) to persistence storage (for example, SSDs 132), the data becomes clean again.

Conventional systems, typically only use cache 116. The size of cache 116 is limited because if there is a power failure, then all the data from cache 116 has to be copied to non-volatile storage so that data is not lost and can be re-covered after power is restored. Backup battery power typically limits the size of a cache that can be used by storage system array 108. Furthermore, backup batteries of storage system array 108 may not power cooling fans that are used to cool the CPUs. The lack of cooling after a power failure also limits how much data can be transferred. As more data continues to being written by storage system array 108, it is desirable to have a bigger write cache.

In one aspect, as mentioned above, disks 136 are used as the second write cache, which allows storage system array 108 to have a larger write cache than just cache 116. Disks 136 may be used to persistently store dirty data from cache 116 before the dirty data is written to its respective storage volume at SSDs 132. The data that is written to disks 136 is referred to as "semi-dirty". The location of any data that is written to disks 136 is saved at the RCB data structure 144. If there is a power loss, then only the RCB data structure 144 needs to be flushed to persistence storage using battery power. Thus, one has to copy less information using battery power vis-à-vis moving all the data from cache 116 as performed by conventional systems that only use a single cache.

In one aspect, dirty data is written to cache 116 and then some or all of that data is written to disks 136 as semi-dirty data. Based on the overall load of storage system array 108, the semi-dirty data is flushed to SSDs 132.

When scheduling data that is written to disks 136, in one aspect, flusher 142 schedules writes in an uninterrupted sequence without skipping any logical block address (LBAs) of disks 136. This allows the disks 136 to efficiently write data because the disks do not need to perform head seek and platter rotation operations that are needed when the write LBAs are out of sequence.

Figure 1C:
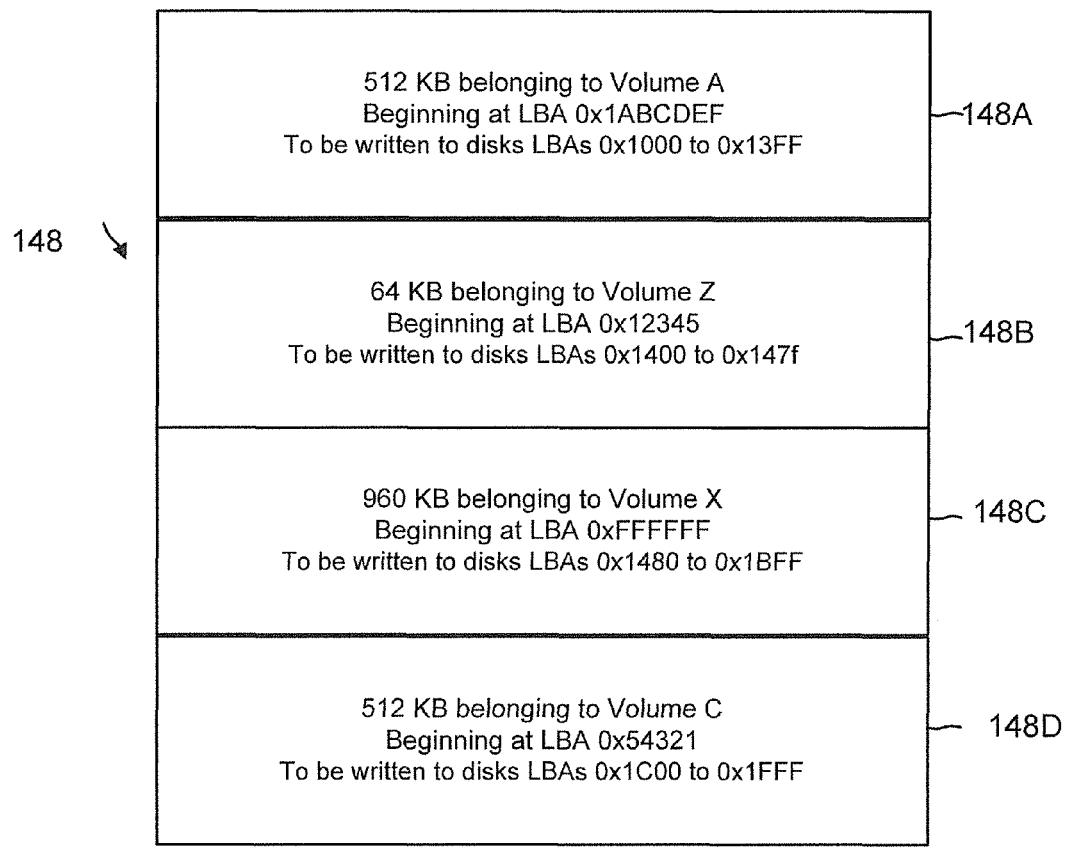
FIG. 1C shows an example of coalescing multiple writes into a contiguous write at a write cache, according to one aspect of the present disclosure.

In one aspect, flusher 142 combines data for multiple volumes into a single write operation. For example, FIG. 1C shows a 2 MB chunk of client data 148 that includes data chunks for different volumes. For example, data chunk 148A is for Volume A, data chunk 148B is for Volume Z, data chunk 148C is for Volume X and data chunk 148D is for Volume C. The different data chunks are written at contiguous LBAs 0x100-0x1FFF at disks 136. When flusher 142 writes to disks 136, a field at RCB data structure 144 is updated to record the LBA of disks 136 where the data is stored.

Figure 1D:
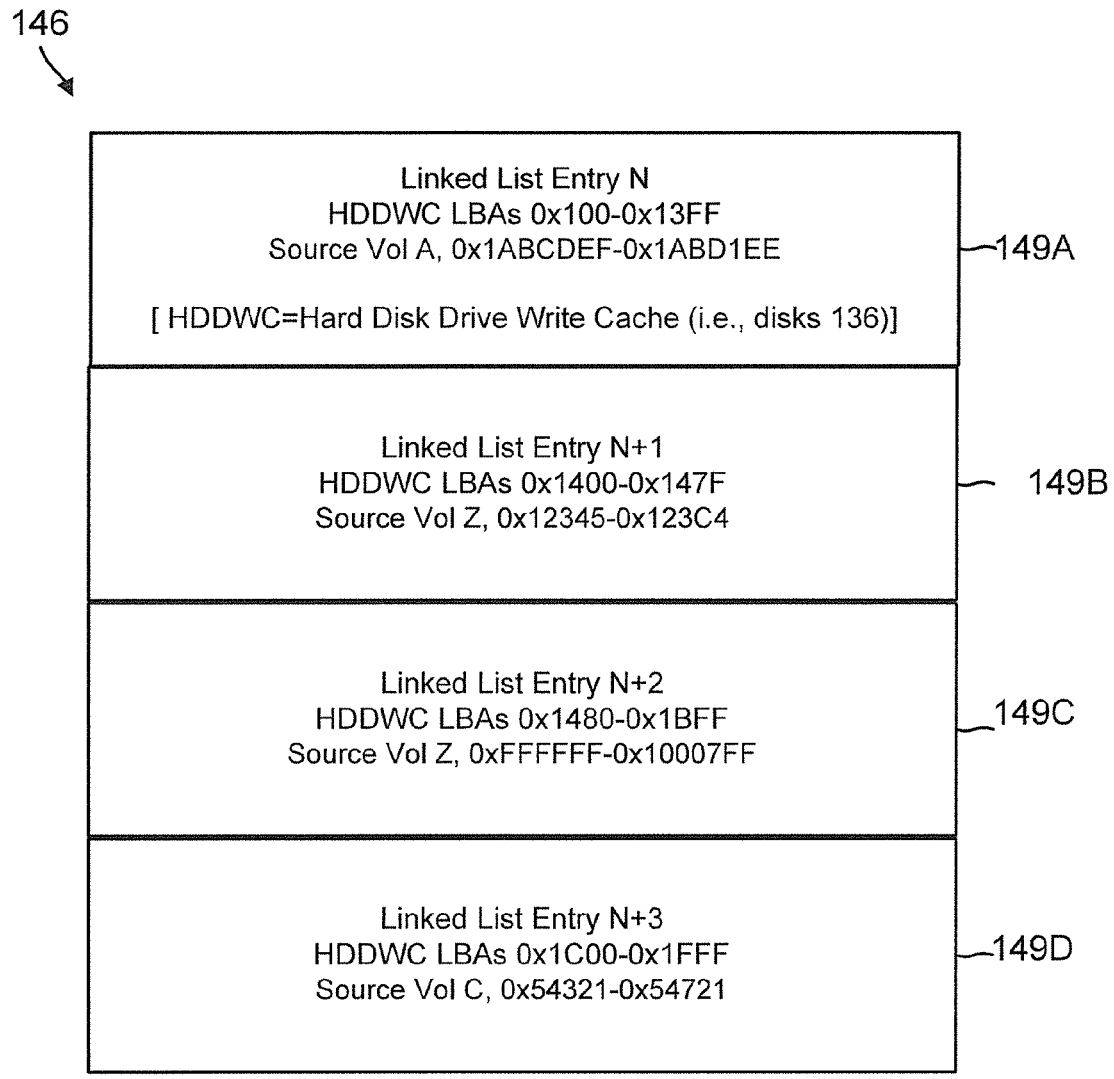
FIG. 1D shows an example of a linked list for tracking data written at a write cache, according to one aspect of the present disclosure.

As mentioned above, flusher 142 maintains the linked list 146 in volatile memory that includes the contents of disks 136. The linked list 146 is a history of writes issued to disks 136. The list may be ordered by the LBA of disks 136. An example of linked list 146 is provided in FIG. 1D having a plurality of entries 149A-149D. The entries 149A-149D correspond to the data chunks 148A-148D of FIG. 1C described above. The use of linked list 146 is provided below in detail.

Figure 1E:
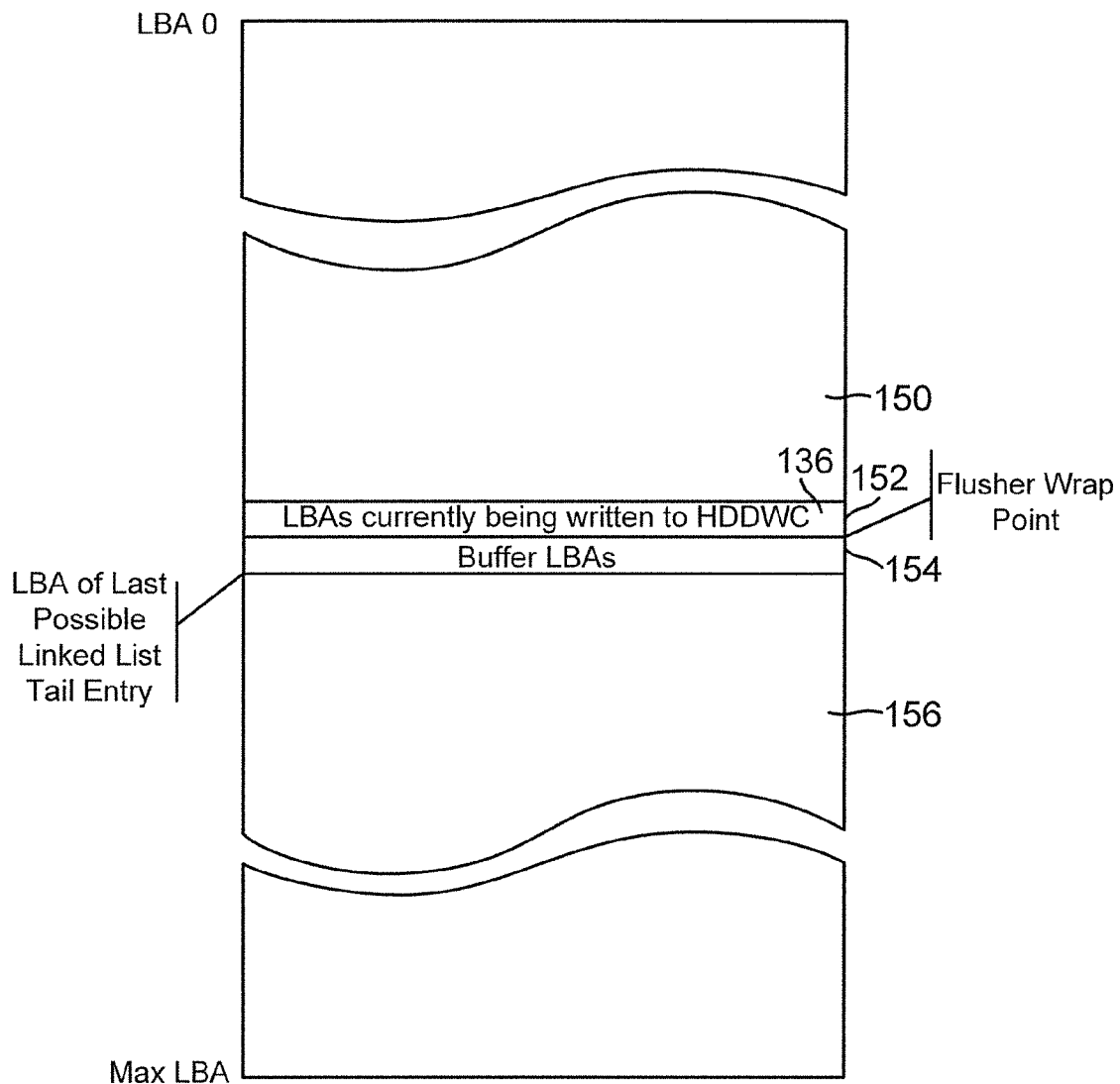
FIG. 1E shows an example how data is written at the write cache at any given time, according to one aspect of the present disclosure.

FIG. 1E shows an example how content is written at drives 136 by flusher 142 and tracked by the linked list 146, according to one aspect. The LBA for drives 136 begin with LBA 0 to a maximum LBA value assigned for each disk 136. LBA0-LBA maximum include various segments, for example, 150, 152, 154 and 156.

The first segment 150 includes entries for data that may have been written recently at disks 136. The entries in this segment are mostly valid i.e. the entries are for data chunks that have not been invalidated by the rewrite operations of FIG. 4 and described below in detail.

Segment 152 includes LBAs that may be currently being written at disks 136. The end of segment 152 indicates a wrap point for flusher 142. This means that flusher 142 should monitor the end (or tail) of the linked list 146 to free up some entries for new data chunks.

Figure 4:
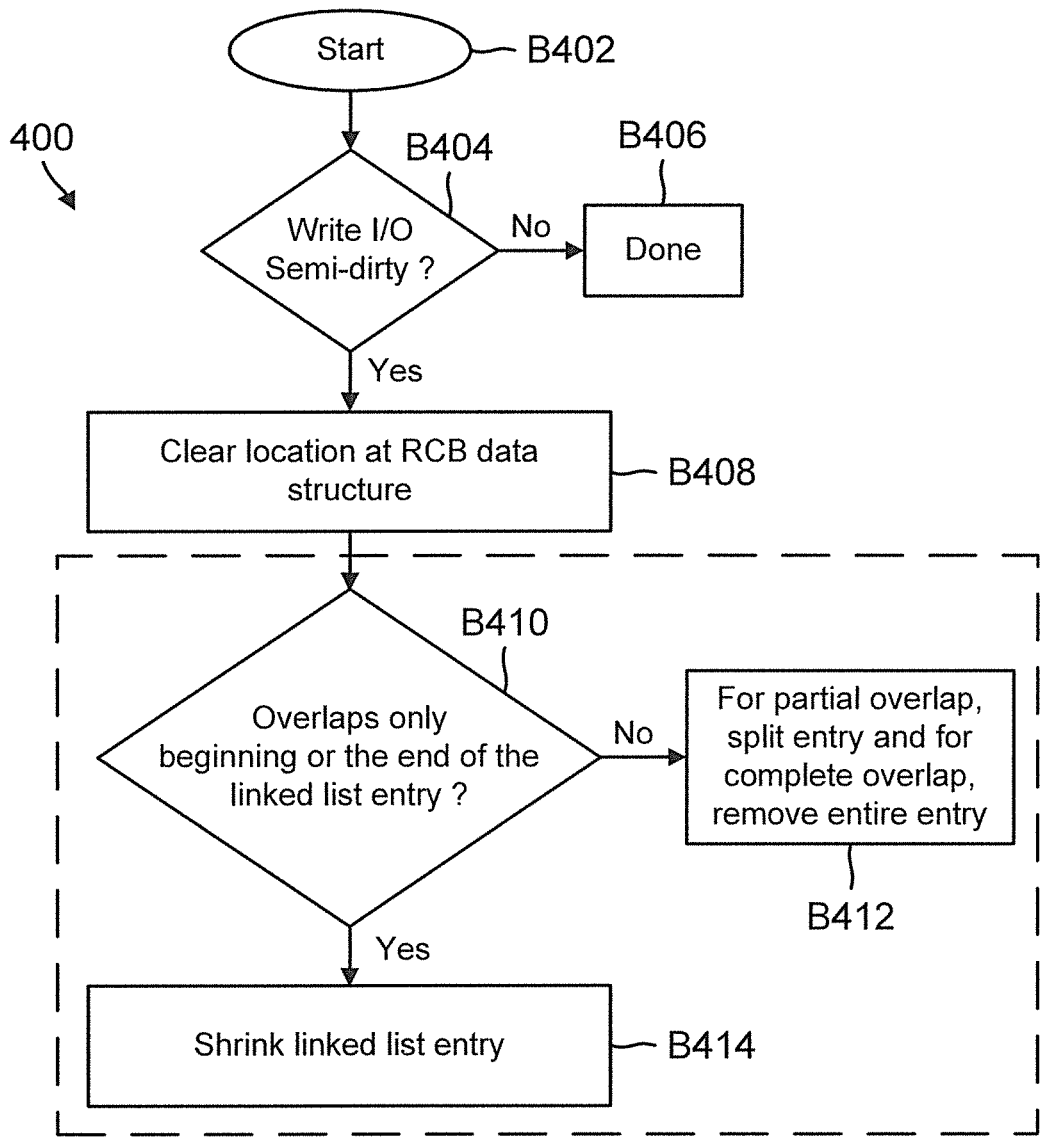

Segment 154 includes buffer LBAs that are used to re-write any valid data from segment 156. In one aspect, data at segment 156 is likely to be entirely invalid (i.e. data was previously written at disks 136 and then rewritten, as shown in FIG. 4). If segment 156 has any valid data then flusher 142 re-writes the valid data using the LBAs of buffer 154. Details regarding the use of the various segments of FIG. 1E are provided below.

Figure 2A:
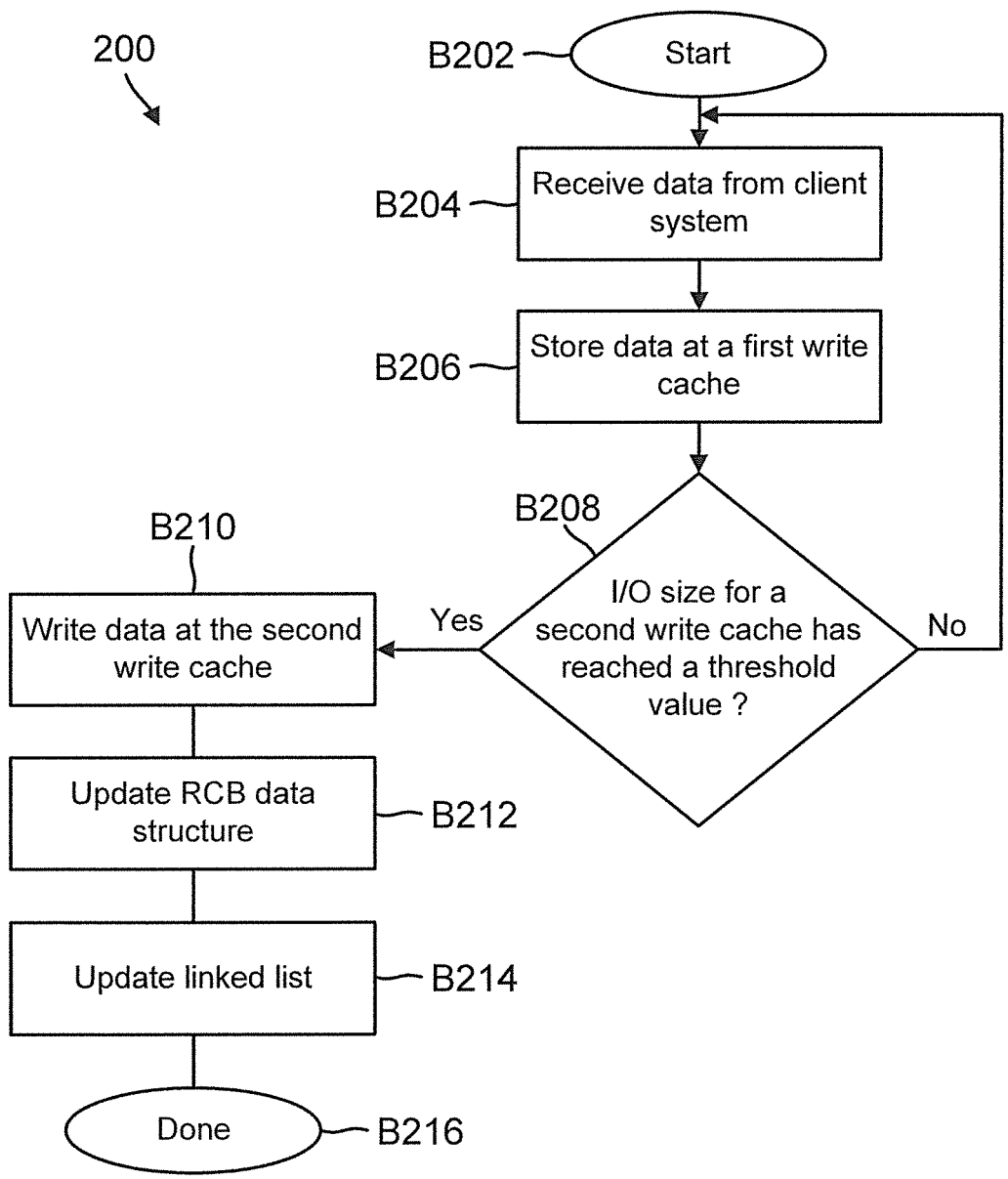
FIGS. 2A-2B and 3-6 show various process flow diagrams, according to the various aspects of the present disclosure.

Process Flows:

FIG. 2A shows an overall process 200 for using the first write cache (116, FIG. 1A) and the second write cache (disks 136, FIG. 1A), according to one aspect of the present disclosure. The process begins in block B202, when client system 102 and the storage system array 108 are initialized and operational. In block B204, data is received from the client system 102. The received data is considered dirty. In block B206, the storage system array 108 stores the data as "dirty data" at the first cache 116.

In block B208, flusher 142 determines if an I/O size to write the received data meets a threshold size. The threshold size is used to optimize write operations at the second write cache 136. If the threshold size has not been reached, then the process reverts back to block B204.

If the threshold size has been reached, then in block B210, the data is written at disks 136. In block B212, the location of the written data is updated at RCB data structure 144. This allows flusher 142 to rebuild the linked list 146, if there is any power failure.

In block B214, the linked list 146 is updated corresponding to the data that is written at disks 136. Thereafter, the process ends in block B216.

Figure 2B:
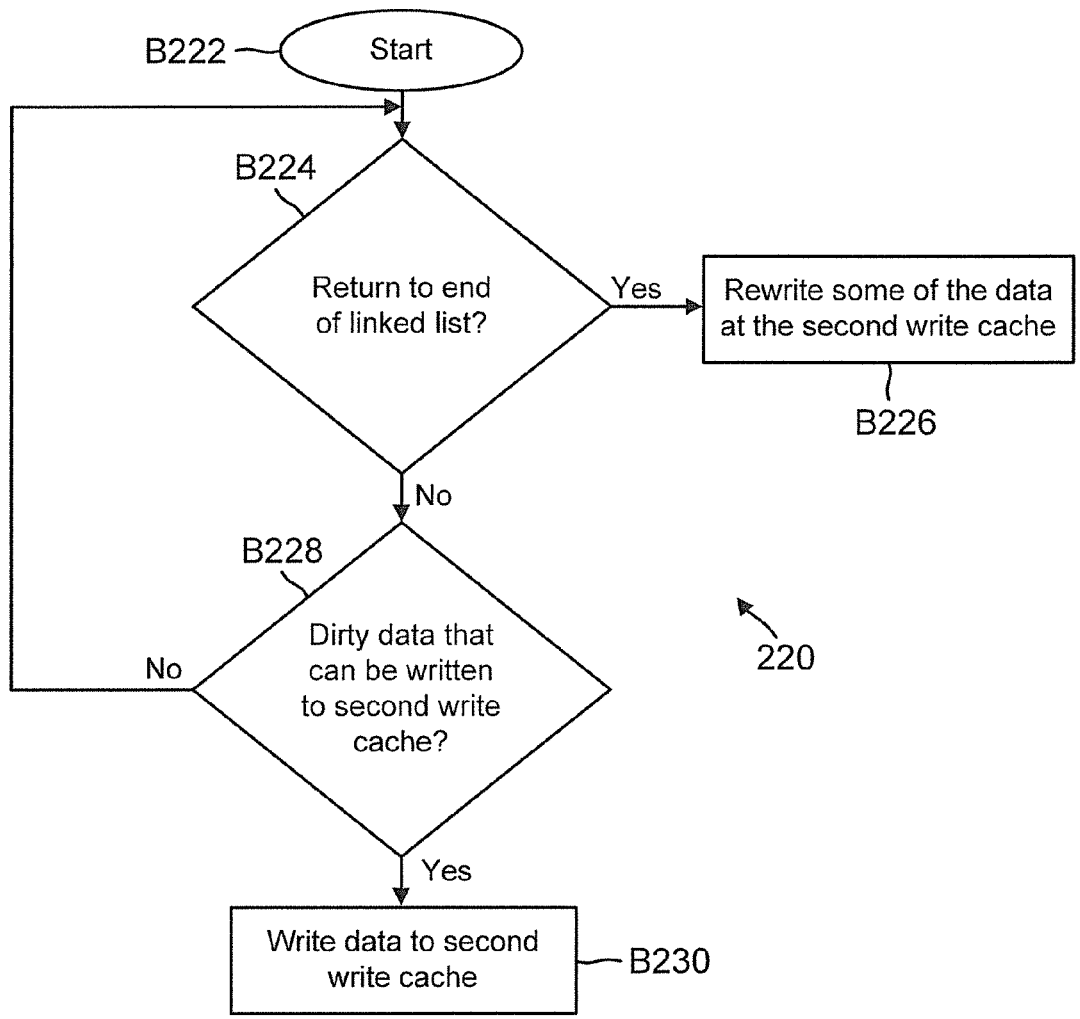

FIG. 2B shows a process 220 for writing data to disks 136 by flusher 142, according to one aspect. The process begins in block B222, when storage system array 108 is operational and flusher 142 is initialized.

In block B224, flusher 142 evaluates the linked list 146 to determine if segment 152 is too close to space 154 i.e. if a wrapping point to write to the linked 146 may have been reached. If yes, then it indicates to flusher 142 that there may be some valid data in segment 156 that may have to be re-written at disks 136. The valid data may be re-written at the additional buffer space 154 in block B226.

If the wrapping point has not been reached in block B224, then in block B228, flusher 142 determines if there is dirty data at cache 116 that can be written to disks 136. If yes, then data is written to disks 136 in block B230, otherwise the process reverts back to block B224.

Figure 3:
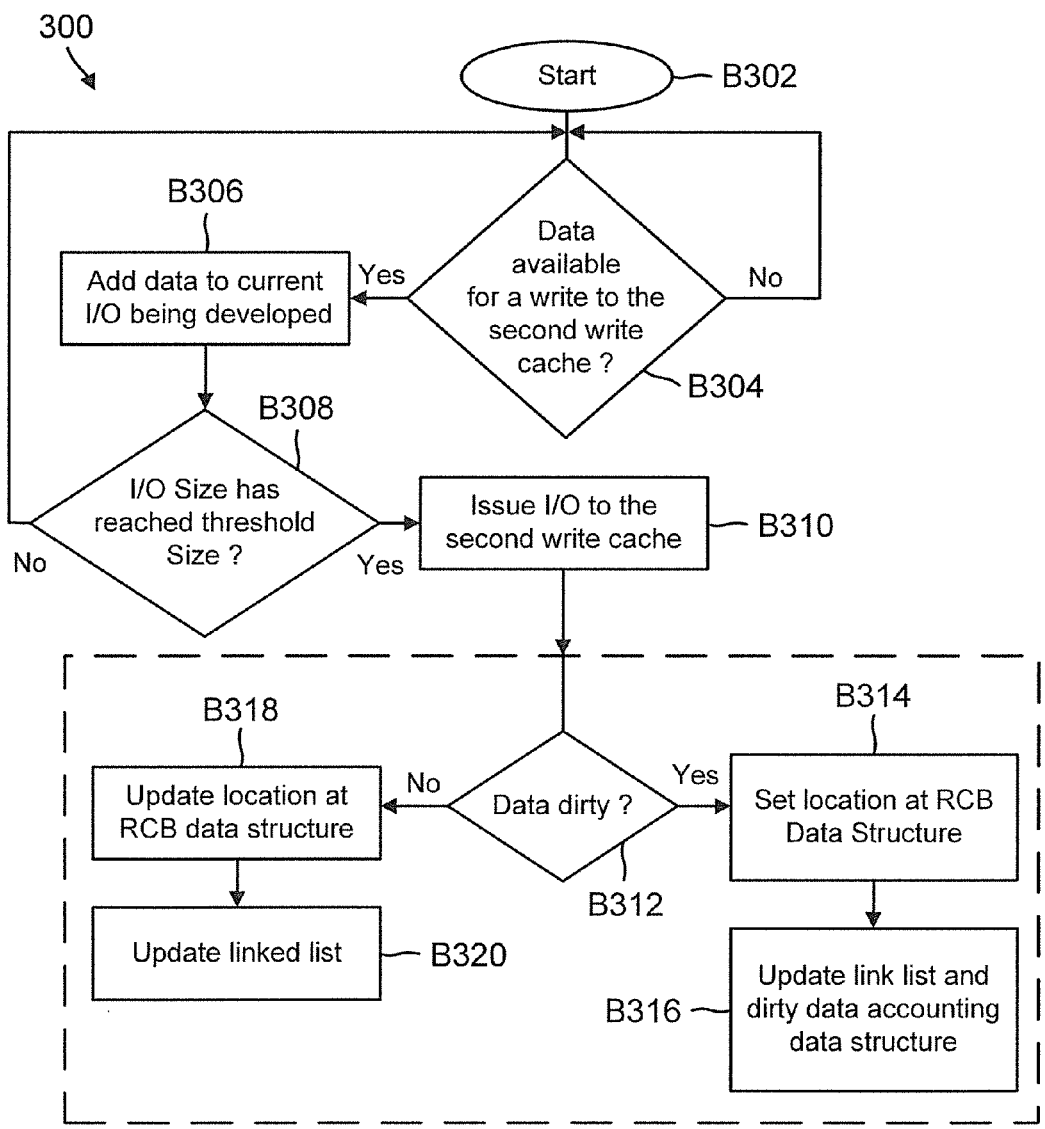

FIG. 3 shows a detailed process 300 for writing to disk 136, according to one aspect. Process 300 is managed by flusher 142 and may involve writing dirty data from cache 116 or re-writing the semi-dirty data at disk 136. Flusher 142 selects dirty or semi-dirty data from process 220, described above.

The process begins in block B302. In block B304, flusher 142 determines if there is any dirty or semi-dirty data that needs to be written. If not, then the process reverts to block B302.

If yes, then in block B306, flusher 142 adds the data that needs to be written to a current input/output (I/O) request that is being developed for disks 136. In block B308, flusher 142 determines if the size of the current I/O request has reached a desired size or a threshold value. In one aspect, the desired size may be configurable to optimize write operations and usage of storage space at disks 136. If the desired size has not been reached, then the process reverts back to block B304.

If the desired size has been reached, then flusher 142 issues an I/O request to write to disks 136 using contiguous LBAs. As described above, the I/O request is to write various data chunks and process blocks B312-B320 are repeated for each data chunk.

In block B312, flusher 142 determines if the data that is to be written is dirty i.e. from cache 116. If the data is dirty, then in block B314, the data is written at disks 136 and the location of where the data is written is set at RCB data structure 144. Thereafter, an entry is added to the linked list in block B316. An accounting data structure (not shown) maintained by flusher 142 is also updated. The accounting data structure tracks the amount of dirty/semi-dirty data that is being maintained by flusher 142 at any given time.

If the data is not dirty as determined in block B312, then it means the data is for a re-write operation based on the evaluation of segment 156 (FIG. 1E) of the linked list. Flusher 142 re-writes the data and then updates the RCB location at data structure 144. The linked list is also updated in block B320.

FIG. 4 shows a process 400 for invalidating a linked list entry, when semi-dirty data is being re-written, according to one aspect. The process begins in block B402, when a client 102 and/or application 104 rewrite data.

In block B404, flusher 142 determines if there is a write I/O for semi-dirty data. If not, then the process ends in block B406.

If there is a write I/O for semi-dirty data, then in block B408, a location at the RCB data structure 144 associated with the data for the write I/O is cleared. It is noteworthy that data in the write I/O may affect one or more linked list entries. The process blocks B410-B414 described below are for each linked list entry.

In block B410, flusher 142 determines if the data that is being written overlaps only with a beginning or the end of a linked list entry. If not, then that means the overlap is either with the entire entry or part of it. Hence, in block B412, for partial overlap, the entry may be split and for compete overlap, the entry is removed.

If the data that is being written overlaps only with a beginning or the end of a linked list entry then in block B414, the linked list is shrunk by removing the affected entry. The non-overlapping portion of the entry remains in the linked list.

Figure 5:
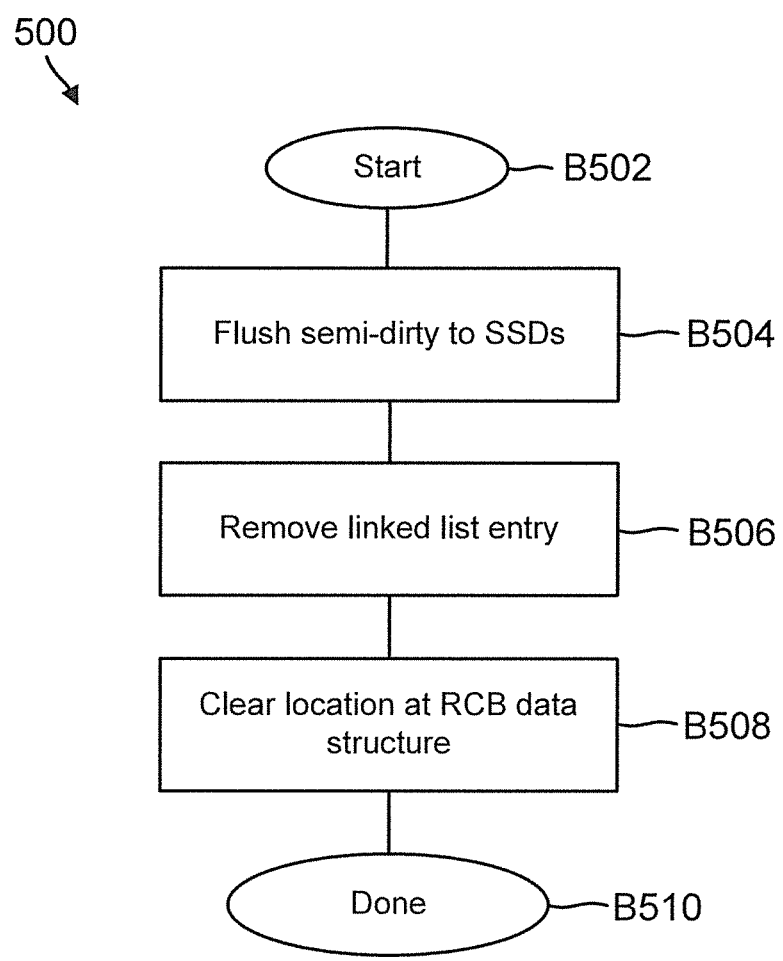

FIG. 5 shows a process 500 for writing semi-dirty data at a storage volume at SSDs 130. The process begins in block B502. In block B504, data from disks 136 are copied to SSDs 130. It is noteworthy that in normal operations data may be copied from cache 116 to SSDs 130. In case of a power failure or similar situation, data is copied from disks 136 to SSDs 130. In block B506, the linked list entries associated with the written data are removed. The location for the data copied to SSDs 130 is also removed from the RCB data structure 144 and the process ends in block B510.

Figure 6:
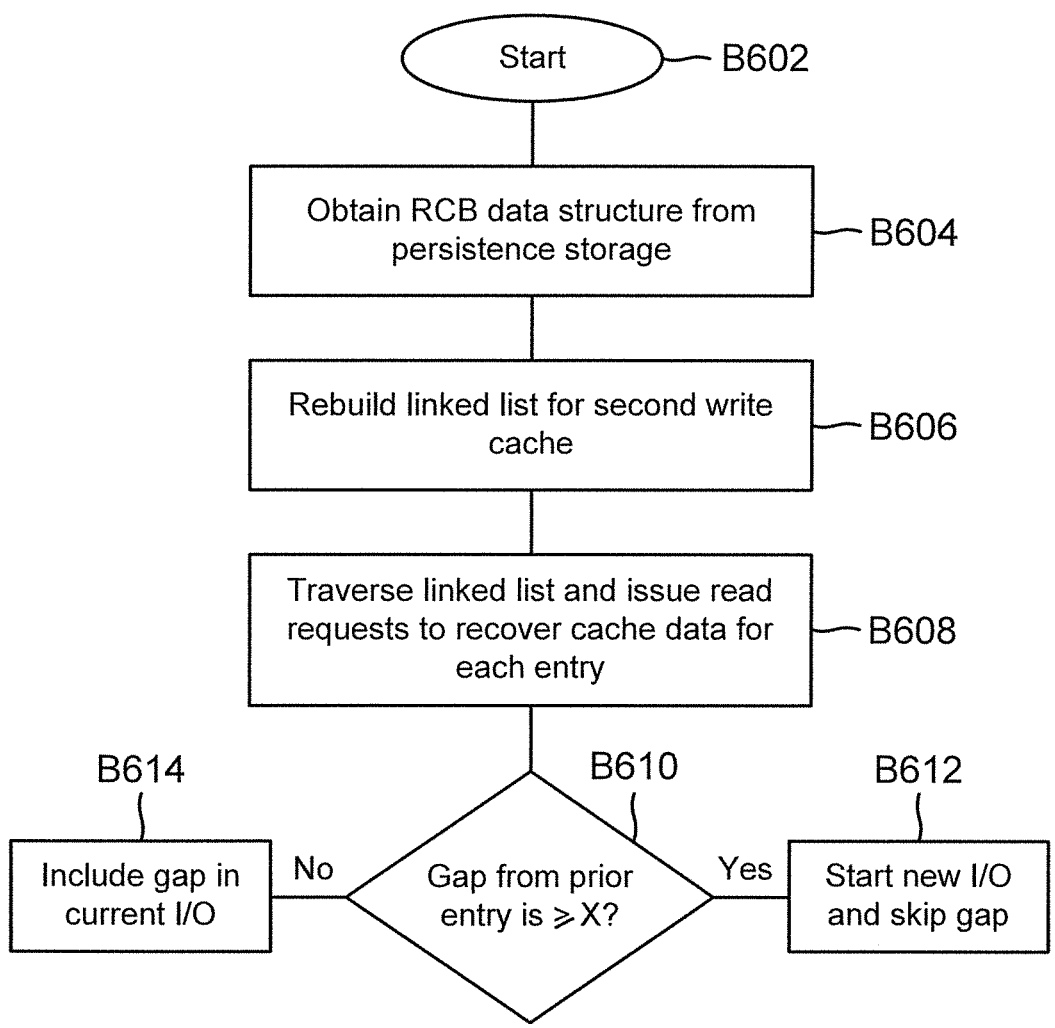

FIG. 6 shows a process 600 for rebuilding the linked list, after a power disruption. The process begins in block B602, after power is disrupted at storage system array 108. RCB data structure 144 is transferred to persistence storage from memory 114, while storage system array 108 waits for power to be restored. The persistence storage may be at SSD 130. Thereafter, power is restored to storage system array 108.

In block B604, flusher 142 obtains the RCB data structure 144 from persistence storage. The RCB data structure includes the LBA of each chunk of data that is stored at disk 136. Using the location information, flusher 142 rebuilds the semi-dirty data linked list in block B606.

Thereafter, in block B608, flusher 142 traverses the re-built linked list to recover data and move it to cache 116. Flusher 142 issues a read I/O request to obtain semi-dirty data from disks 136.

In block B610, flusher 142 determines if a gap between the LBAs of two linked list entries is greater than or equal to a certain size "X". If yes, then in block B612, a new I/O request is generated. If not, then in block B614, a single I/O may be generated with the gap for both the entries. This prevents head rotation and is more efficient to read data from disks 136.

The various aspects described above have various advantages over conventional systems using a single cache. For example, by using the second write cache, one is able to increase the size of available write cache. The second write cache also allows one to improve the overall life of SSDs 132. SSDs typically can handle a certain number of write operations. By using the second write cache, the number of write operations at the SSDs can be optimized. This improves the overall life of the SSDs.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure followed by a "server" layer that includes hardware and computer software designed for cloud specific services. Details regarding these layers are not germane to the inventive aspects. The storage system arrays described above can be a part of the server layer for providing storage services.

Thus, methods and systems for using a plurality of write cache are provided. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
   receiving data for storing at a storage device of a storage system;
   temporarily storing the received data at a first write cache;
   generating, in response to an input/output (I/O) request size including the received data reaching a threshold value, an I/O request for a persistence storage device used as a second write cache;
   transferring, based on the generating the I/O request, the received data from the first cache to the persistence storage device;
   updating a recovery control block with a location of the received data stored at the persistence storage device;
   adding an entry at a linked list that is used to track valid data stored at the persistence storage device;
   transferring the received data from the persistence storage device to the storage device of the storage system;
   using the recovery control block, after a power failure, for re-building the linked list; and
   transferring valid data from the persistence storage device to the first cache based on the re-built linked list.

2. The method of claim 1, wherein after a power failure, transfer from the first cache to another location using battery power is limited to the recovery control block such that the linked list can be re-built using the recovery control block.

3. The method of claim 1, wherein the threshold value is used to optimize write operations at the persistence storage device using contiguous logical block addresses.

4. The method of claim 1, further comprising:
   deleting a linked list entry corresponding to the received data that is transferred from the persistence storage device to the storage device.

5. The method of claim 1, wherein the storage device is a solid state storage device.

6. The method of claim 1, wherein the first cache is a volatile memory device and the persistence storage device is a non-solid state storage device.

7. A non-transitory, machine readable medium having stored thereon instructions for performing a method, comprising machine executable code which when executed by at least one machine, causes the machine to:
   receive data for storing at a storage device of a storage system;
   temporarily store the received data at a first write cache;
   generate, in response to an input/output (I/O) request size including the received data reaching a threshold value, an I/O request for a persistence storage device used as a second write cache;
   transfer, based on the generation of the I/O request, the received data from the first cache to the persistence storage device;
   update a recovery control block with a location of the received data stored at the persistence storage device;
   add an entry at a linked list that is used to track valid data stored at the persistence storage device;
   transfer the received data from the persistence storage device to the storage device of the storage system;
   use the recovery control block, after a power failure, for re-building the linked list; and
   transfer valid data from the persistence storage device to the first cache based on the re-built linked list.

8. The non-transitory medium of claim 7, wherein after a power failure, transfer from the first cache to another location using battery power is limited to the recovery control block such that the linked list can be re-built using the recovery control block.

9. The non-transitory medium of claim 7, wherein the threshold value is used to optimize write operations at the persistence storage device using contiguous logical block addresses.

10. The non-transitory medium of claim 7, the instructions further causing the machine to:

delete a linked list entry corresponding to the received data that is transferred from the persistence storage device to the storage device.

11. The non-transitory medium of claim 7, wherein the storage device is a solid state storage device.

12. The non-transitory medium of claim 7, wherein the first cache is a volatile memory device and the persistence storage device is a non-solid state storage device.

13. A computing device, comprising:
a memory containing machine readable medium comprising machine executable code having stored thereon instructions for performing a method of protecting cache data; and
a processor coupled to the memory, the processor module-configured to execute the machine executable code to cause the processor to:
receive data for storing at a storage device of a storage system;
temporarily store the received data at a first write cache;
generate, in response to an input/output (I/O) request size including the received data reaching a threshold value, for a persistence storage device used as a second write cache;
transfer, based on the generation of the I/O request, the received data from the first cache to the persistence storage device;
update a recovery control block with a location of the received data stored at the persistence storage device;
add an entry at a linked list that is used to track valid data stored at the persistence storage device;
transfer the received data from the persistence storage device to the storage device of the storage system;
use the recovery control block, after a power failure, for re-building the linked list; and
transfer valid data from the persistence storage device to the first cache based on the re-built linked list.

14. The computing device of claim 13, wherein after a power failure, transfer from the first cache to another location using battery power is limited to the recovery control block such that the linked list can be re-built using the recovery control block.

15. The computing device of claim 13, wherein the threshold value is used to optimize write operations at the persistence storage device using contiguous logical block addresses.

16. The computing device of claim 13, wherein a linked list entry corresponding to the received data that is transferred from the persistence storage device to the storage device is deleted after the transfer.

17. The computing device of claim 13, wherein the first cache is a volatile memory device and the persistence storage device is a non-solid state storage device.

* * * * *